United States Patent
Grund

(10) Patent No.: US 9,191,260 B1
(45) Date of Patent: Nov. 17, 2015

(54) METHOD AND APPARATUS TO DETERMINE A MATCH BETWEEN SIGNALS

(71) Applicant: LightWorks II, LLC, Longmont, CO (US)

(72) Inventor: Christian J. Grund, Boulder, CO (US)

(73) Assignee: LIGHTWORKS II, LLC, Longmont, CO (US)

( * ) Notice: Subject to any disclaimer, the term of this patent is extended or adjusted under 35 U.S.C. 154(b) by 0 days.

(21) Appl. No.: 14/196,916

(22) Filed: Mar. 4, 2014

Related U.S. Application Data

(60) Provisional application No. 61/775,108, filed on Mar. 8, 2013.

(51) Int. Cl.
*H03D 1/00* (2006.01)
*H04L 27/26* (2006.01)
*H04L 7/04* (2006.01)

(52) U.S. Cl.
CPC ............ *H04L 27/2663* (2013.01); *H04L 7/042* (2013.01)

(58) Field of Classification Search
CPC .. H04L 7/042; H04L 27/2662; H04B 1/7093; H04B 1/707; H04B 1/709; H04B 1/7073; H04B 1/71637; G06F 17/15; G06F 7/02; H05K 999/99; G01S 7/52026; G06J 1/00; G06J 3/453
USPC .................................. 375/316, 343; 708/422
See application file for complete search history.

(56) References Cited

U.S. PATENT DOCUMENTS

| | | | | |
|---|---|---|---|---|
| 4,412,340 | A * | 10/1983 | Bartlett et al. | 375/343 |
| 6,414,986 | B1 * | 7/2002 | Usui | 375/142 |
| 6,731,711 | B1 * | 5/2004 | Jun | 375/368 |
| 7,295,601 | B1 * | 11/2007 | Sinha et al. | 375/222 |
| 2005/0185743 | A1 * | 8/2005 | Li | 375/350 |
| 2006/0133544 | A1 * | 6/2006 | Kawada et al. | 375/343 |

* cited by examiner

*Primary Examiner* — Tesfaldet Bocure
(74) *Attorney, Agent, or Firm* — Perkins Coie LLP

(57) ABSTRACT

A method and system to determine a match between a known and unknown signal is provided. The method and system first conditions an unknown signal by anti-aliasing and digitizing the unknown signal. The condition signal is then compared on a bit by bit basis to at least one known signal to determine a match. A threshold detector determines that the conditioned signal matches the at least one known signal when the number of bit matches exceeds a predetermined threshold.

19 Claims, 9 Drawing Sheets

Linear architecture Binary Matching Processor System

Fig. 1 Linear architecture Binary Matching Processor System

Fig. 2 Input Signal Conditioning for the Linear Binary Matching Processor

Fig. 3 Simple Single Channel Matching Processor for the Linear Binary Matching Processor Fig. 4 Simple Single Channel Threshold Detector for the Linear Binary Matching Processor

|   | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|---|---|---|---|---|---|---|---|---|---|---|---|---|---|---|---|
| 1 | 1 | 1 | 1 | 1 | 1 | 1 | 1 | 1 | 1 | 1 | 1 | 1 | 1 | 1 | 1 | 1 | 0 | 0 | 0 | 0 | 0 | 0 | 0 | 0 | 0 | 0 | 0 | 0 | 0 | 0 | 0 | 0 |
| 2 | 1 | 1 | 1 | 1 | 1 | 1 | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 3 | 1 | 1 | 1 | 1 | 1 | 1 | 0 | 0 | 0 | 0 | 0 | 0 | 1 | 1 | 1 | 1 | 0 | 0 | 0 | 1 | 1 | 1 | 1 | 1 | 1 | 1 | 1 | 0 | 0 | 0 | 0 | 0 |
| 4 | 1 | 1 | 1 | 1 | 0 | 0 | 0 | 0 | 0 | 1 | 1 | 1 | 0 | 0 | 1 | 1 | 0 | 1 | 1 | 0 | 0 | 1 | 1 | 0 | 0 | 1 | 1 | 1 | 1 | 0 | 0 | 0 |
| 5 | 1 | 1 | 1 | 0 | 0 | 0 | 1 | 1 | 1 | 1 | 1 | 0 | 0 | 0 | 0 | 1 | 1 | 0 | 0 | 1 | 1 | 1 | 0 | 0 | 0 | 0 | 1 | 1 | 1 | 1 | 0 | 0 |
| 6 | 1 | 1 | 1 | 0 | 0 | 1 | 1 | 1 | 0 | 0 | 1 | 1 | 1 | 0 | 0 | 1 | 0 | 1 | 1 | 0 | 0 | 0 | 1 | 1 | 1 | 0 | 0 | 1 | 1 | 1 | 0 | 0 |
| 7 | 1 | 1 | 0 | 0 | 0 | 1 | 1 | 0 | 0 | 1 | 1 | 0 | 0 | 0 | 1 | 1 | 1 | 0 | 1 | 1 | 1 | 0 | 1 | 0 | 0 | 1 | 1 | 1 | 0 | 0 | 0 | 0 |
| 8 | 1 | 1 | 0 | 0 | 1 | 1 | 0 | 0 | 1 | 1 | 0 | 0 | 1 | 1 | 0 | 0 | 0 | 0 | 0 | 1 | 1 | 1 | 1 | 0 | 0 | 0 | 0 | 1 | 1 | 1 | 0 | 0 |
| 9 | 1 | 1 | 0 | 0 | 1 | 0 | 0 | 1 | 0 | 0 | 1 | 0 | 0 | 1 | 0 | 1 | 1 | 1 | 0 | 1 | 1 | 0 | 1 | 0 | 0 | 1 | 0 | 1 | 0 | 1 | 1 | 0 |
| 10 | 1 | 1 | 0 | 1 | 1 | 0 | 0 | 0 | 0 | 1 | 0 | 0 | 1 | 0 | 1 | 0 | 1 | 0 | 1 | 0 | 0 | 1 | 0 | 0 | 1 | 0 | 1 | 1 | 0 | 1 | 1 | 0 |
| 11 | 1 | 1 | 0 | 1 | 0 | 0 | 1 | 0 | 0 | 0 | 1 | 0 | 0 | 1 | 1 | 0 | 1 | 1 | 0 | 0 | 1 | 0 | 0 | 1 | 0 | 0 | 1 | 1 | 0 | 0 | 1 | 0 |
| 12 | 1 | 0 | 0 | 1 | 0 | 1 | 1 | 0 | 1 | 0 | 0 | 1 | 1 | 0 | 1 | 0 | 0 | 1 | 0 | 1 | 0 | 1 | 0 | 0 | 1 | 1 | 0 | 1 | 0 | 0 | 1 | 0 |
| 13 | 1 | 0 | 1 | 1 | 0 | 0 | 0 | 1 | 0 | 1 | 1 | 1 | 0 | 1 | 0 | 1 | 0 | 0 | 1 | 0 | 1 | 1 | 1 | 0 | 0 | 1 | 1 | 1 | 1 | 1 | 1 | 0 |
| 14 | 1 | 0 | 1 | 0 | 0 | 1 | 0 | 1 | 0 | 0 | 0 | 0 | 1 | 1 | 1 | 0 | 1 | 0 | 0 | 1 | 0 | 0 | 1 | 1 | 1 | 0 | 0 | 1 | 1 | 0 | 1 | 0 |
| 15 | 1 | 0 | 1 | 0 | 1 | 0 | 0 | 0 | 1 | 1 | 1 | 1 | 1 | 0 | 1 | 0 | 0 | 0 | 1 | 0 | 1 | 1 | 0 | 1 | 1 | 1 | 0 | 0 | 1 | 0 | 1 | 0 |
| 16 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 |

Bit Pattern sequences (columns) for 16 frequency channels (rows) uniformly spaced between the highest frequency (set at half the digitizer rate) channel 16 and lowest frequency 1 (1/16 of the highest frequency).

Fig. 8

METHOD AND APPARATUS TO DETERMINE A MATCH BETWEEN SIGNALS

CROSS-REFERENCE TO RELATED PATENT APPLICATIONS

Cross reference is made to disclosure document No. 417272, received in the U.S. Patent and Trademark Office on Apr. 7, 1997, titled "Disclosure of Simple Digital Correlator."

The present application claims priority to U.S. Provisional Application Ser. No. 61/775,108, filed Mar. 8, 2013, and is related to U.S. patent application Ser. No. 09/543,294, filed Apr. 5, 2000, which claims priority based on U.S. Provisional Application Ser. No. 60/127,694, filed Apr. 5, 1999, each of which is incorporated herein by reference.

STATEMENT REGARDING FEDERALLY SPONSORED RESEARCH

The U.S. Government may have a paid-up license in at least some aspects of this invention and the right in limited circumstances to require the patent owner to license others on reasonable terms or as provided for by the terms of Contract Nos. F33615-96-C-1888, F33615-98-C-1258 and F33615-99-C-1407 awarded by the United States Air Force.

BACKGROUND

The present application relates to a method and apparatus to determine the similarity or sufficient matching between two patterns or signal patterns, including the determination of the frequency and phase thereof.

Determining the degree of matching (similarity) between two signals is important in a number of applications. Typical examples include security systems, frequency analysis, image processing, and communications. Matching systems can be broadly divided into two categories—those that require two signals to be perfectly matched for some further action to take place, and those that are useable with only partial matching.

Security systems, for example, typically require perfect matching. In such systems, an input signal, such as a personal identification number (PIN) code punched into an automatic teller machine (ATM) by a user, requires that all digits are identical to a predetermined user code. If the two multi-digit numbers are not perfectly matched, the ATM will reject the user. In such systems, there is little use in permitting partial matching or similarity. If punching in only 3 out of 4 numbers were acceptable, multiple users could be charged with a transaction. Matchers of this type could easily be built as integrated circuits, where the output indicates which of a set of predetermined codes is identical, i.e., matched perfectly.

For other types of applications, the signals do not need to be identical, i.e., a perfect match. Rather, the application only requires a degree of similarity between the input signal and some other signal. For example, an image processing system could be used in conjunction with a camera to determine whether the camera is looking at a car or an airplane. Because "cars" and "airplanes" can include different types with dissimilar body shapes and colors, there is typically no such thing as a perfect match to a car or airplane, only a degree of similarity based upon comparisons of the input image against a set of test parameters, where each test parameter represents, for example, a specific car model viewed at a specific magnification and angle. If the degree of similarity for a particular test parameter exceeds some predetermined threshold level, a matcher may indicate a match. The match or similarity also may have a degree of confidence. With reference to the specific car above, the car may be identified as either model A or model B where model A has a higher degree of confidence because it resulted in more similarities than model B. Similarities may be a closer wheelbase, a closer chassis length or height, etc.

Other types of applications may compare a first signal (or unknown) with one or more test parameters. One particular type of application relates to frequency analysis, and in particular, measuring the frequency of an unknown signal. Depending upon the nature of the signal, this type of measurement can be approached in many ways. For simple periodic signals with little noise, i.e., if the signal-to-noise ratio (SNR) is large, such as >>0 dB, such as a sine wave, the solution can be as simple as measuring the time between zero-crossings of the signal to determine the frequency. If the SNR is low, which indicates high noise levels, this method fails because a signal can be driven across the zero point by the noise. For such cases, more complex detection techniques are required. These include conventional spectrum analysis tools, such as those available from numerous commercial vendors, including Hewlett-Packard, Tektronix, B&K Instruments, and others. Alternatively, an analog signal may be digitized so a computer can perform a fast Fourier transform (FFT) on the data. The squared magnitude of a complex FFT represents a histogram of frequency (or spectral power) content of the signal over an explicitly defined set of predetermined frequencies. For example, a 256 point FFT represents 128 unique frequency bins. Each frequency bin indicates the relative amount of power at the corresponding frequency.

Digital FFTs can be performed in hardware or in software and represents the most common method of analyzing the frequency content of a signal. Despite its popularity, the FFT also has certain significant drawbacks. FFT algorithms are relatively complex and are difficult to implement for "real-time" calculations. One potential problem is latency, i.e., a computational result may appear with a significant delay following input of the last data sample. A second problem is bottle-necking, i.e., data is read into the front end of the processor faster than it can be processed and read out. This may result in the need to discard potentially useful data while the processor is busy. A third issue relates to sampling speed and scalability to large data sets. With the high complexity of FFTs, it becomes expensive and difficult to design chips beyond, for example, N>1024. Similarly, it becomes difficult to implement processors in high speed semiconductor materials, such as GaAs. A further disadvantage of FFT approaches is that computation times increase very rapidly if the number of samples is not a power of 2. As a result, FFT processors typically use 128, 256, 512, etc., number of samples per transform.

An additional drawback with conventional FFT implementations is that dynamic updates of frequency spectra on a sample-to-sample basis cannot be done rapidly.

With the increased use of digital computers around 1970, researchers began considering binary correlators for implementation in integrated circuits to determine the similarity or degree of match between a first signal and one or more parameters. An example of such a correlator that uses serial and parallel shift registers to calculate correlations and convolutions is described in U.S. Pat. No. 4,161,033. Researchers also focused attention on a set of mathematical functions known as Walsh functions for a number of applications. For reviews, see, e.g., N. M. Blachman, "Sinusoids versus Walsh Functions", IEEE Proc. 62, 346 (1974) and A. Deb et al., "Walsh Functions and their Applications: A Review", IETE Technical Review, 9, 238 (1992). Walsh functions are similar to sines and cosines in the sense that they are periodic. However, rather than take on a continuous set of values, they only take on the values of +1 and −1. The idea of using such functions as the basis for digital calculations resulted in a significant body of work, but there appears to be no reference to the application of Walsh functions and a related transform ("the Walsh-Hadamard transform" or WHT) to the particular problem of calculating spectral content until 1996, when Lu (U.S. Pat. No. 5,566,100) was issued a patent implementing a Walsh-Hadamard transformation for frequency determinations.

Lu's technique requires two steps. First, the zero crossings of an AC signal are calculated in order to ensure that the sampling rate is large enough to meet the so-called Nyquist criterion. Following that first step, the second step comprises setting a suitable sampling rate and comparing the signal to a set of Walsh functions, in order to determine the signal frequency from the Walsh function having the same zero-crossing content as the signal.

A problem with this technique is that it assumes a high SNR, i.e., the signal must be "clean" enough that the first zero-crossing calculation is meaningful. In other words, the zero crossing is the result of the signal and not the noise. However, if the signals are clean enough that the number of zero crossings per unit time can be reliably calculated, there appears to be no need for the second step, because the rate of zero-crossings is by definition twice the signal frequency. In a more common case, the signal has a low SNR, which may be from significant amounts of wideband noise. In this case, simple zero-crossing calculations are not meaningful as the crossings (or lack thereof) may be the result of noise.

A second potential problem is that the Walsh functions are defined in terms of functions having the values+1 and −1, while conventional logic easily implemented in digital logic hardware has logical states of +1 and 0 (zero) corresponding to a high voltage and a zero voltage (for example, +5V and 0V in TTL logic). As a result of these issues, Lu's technique is not suitable for frequency extraction in a general case.

Accordingly, it would be advantageous to provide a method to the similarity or degree of match between two signals using binary logic to perform spectral and generalized correlation calculations, where the degree of similarity is indicated through a predetermined means, and where the signal-to-noise ratio does not have to be very large.

It would be further advantageous to provide a method to use such a matcher to measure the spectral content of a signal without invoking the complexities and other noted drawbacks of FFTs.

It would be further advantageous to provide a simple method that can be implemented in hardware, such as a single integrated circuit chip.

It would be further advantageous to provide a method for such implementation that allows for direct use of binary+1/0 logic.

It would be further advantageous to provide a method that permits simpler scaling to higher frequency resolutions than conventional FFT algorithms.

It would be further advantageous to provide a method that permits implementations of the algorithm requiring a minimum number of logic gates.

It would be further advantageous to provide a method that permits simple implementation in high-speed semiconductor materials.

It would be further advantageous to provide a method that permits rapid calculation of spectral information from an arbitrary number of samples, not simply sequences containing a power of 2 samples.

It would be further advantageous to provide a method that permits a continuous update of spectra without recalculation of an entire spectral transform.

It would be further advantageous to provide a method that permits averaging over any number of N-length sequences without further computational hardware or software, in order to improve the confidence and accuracy of matches.

It would be further advantageous to provide a multiple channel implementation where the detection of similarities is not dependent on inter-cell timing considerations.

It would be further advantageous to provide a multiple channel implementation where the frequency relationship and bandwidth of the channels is independent and flexible It would be further advantageous to provide a method that permits, independent patterns in each channel for rapid pattern detection not requiring post processing in the frequency domain.

SUMMARY

A method is provided which permits very rapid calculation of 1-bit matches. The method is particularly applicable to rapid calculation of the frequency and phase of unknown periodic and aperiodic signals. Hardware implementations suitable for production of single chip integrated circuit processors also are provided.

According to one aspect of the invention, the matching between a first signal and a second signal is determined. The signals are represented by sequences of 0 and 1 states. The two sequences are clocked in parallel and sequentially through a multiplying circuit at a predetermined clock rate. The output of said multiplying circuit is accumulated in an accumulator. The value resulting in said accumulator after a prespecified integration time is representative of the degree of similarity between said first and second signals. Preferably, a ring buffer is used to provide delayed negative feedback to maintain defined operations with a finite sized accumulator to allow new output matches at rates up to and including the input data rate whereby the matched output always reflects the last N input points, as opposed to reading in N data points, calculating the correlation, resetting the accumulator, then reading in a new set of N data points.

DRAWINGS

FIG. 8 is a bit pattern useful for spectral processing generated by the equations consistent with the technology of the present application.

DETAILED DESCRIPTION

The technology of the present application provides methods and mechanisms to determine a frequency or pattern of a first signal by comparison to one or many test patterns or parameters having a known frequency or parametric relationship. The methods and mechanisms provide that the zero-crossing, information is much more important in determining signal similarities or degree of matching than is signal amplitude. In particular, for a number of applications, accurate recovery of the frequency content of a signal may be far more important than accurate recovery of the associated amplitude information. Such is the case in many Doppler signal processing scenarios. The primary goal is to accurately measure the frequency of a signal in low SNR applications, with little concern for the signal strength. In these situations, FFT's are not the simplest processing solutions. Because frequency is intimately related to the number of zero-crossings of a signal per unit time, and the signal phase is related to the relative temporal location of the zero crossings, it may be that retention of only zero-crossing (phase) information, while discarding all amplitude information, loses very little in terms of frequency and phase determination.

One advantage of discarding amplitudes is that the entire processing problem can be reduced to the single-bit binary domain. As a result, high speed processing becomes more feasible and does not rely on any multi-bit multiplications or additions. As will be appreciated below, the process may be implemented using only single logic gates, which may provide simplifications in hardware implementations over conventional FFT processing. For purposes of clarity, the technology of the present application may be considered a Binary Matching Processor, Binary Math Processor, or BMP.

Figure 1:
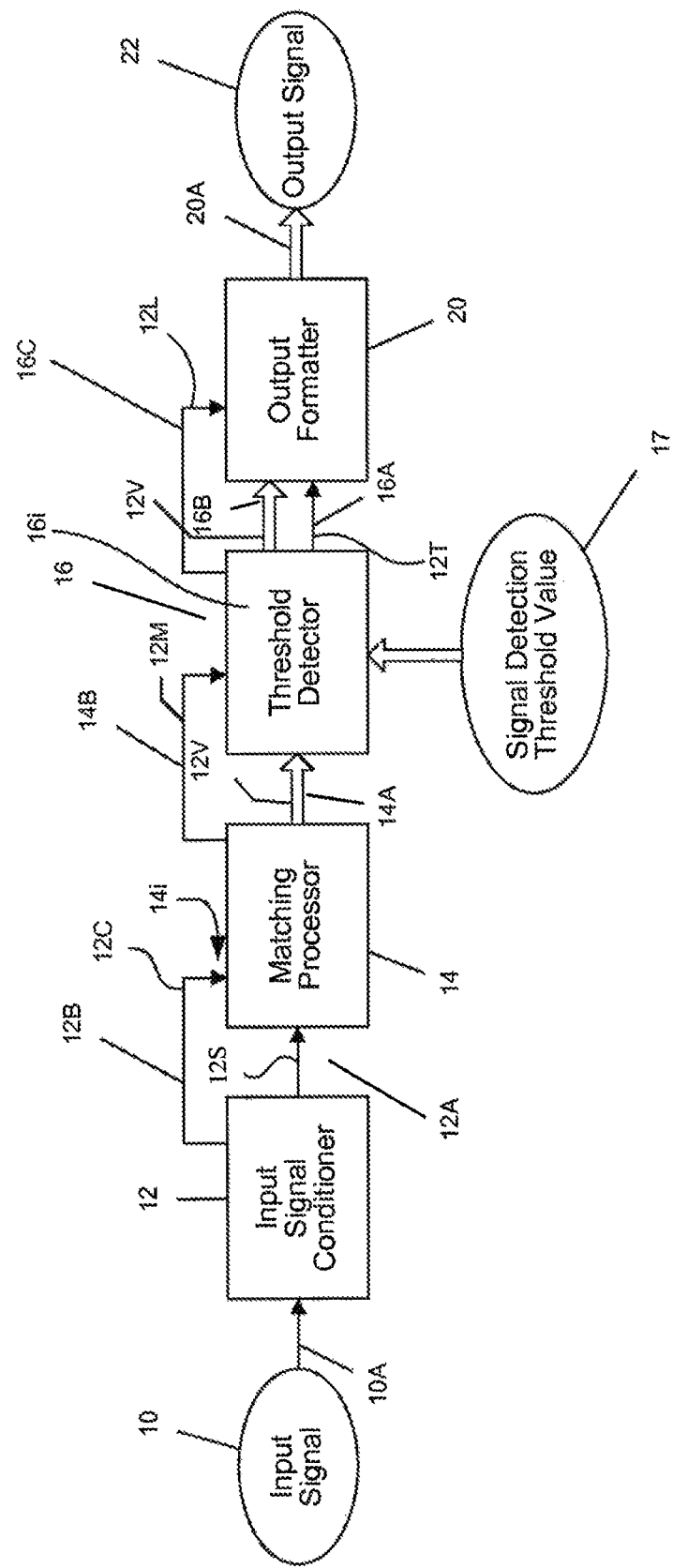
FIG. 1 illustrates a single channel Linear Binary Matching Processor system.

FIG. 1 shows a block diagram of a possible BMP illustrating a saleable linear pipelined architecture and providing a framework for the detailed disclosure of the instant technological method and apparatus. While it is possible to use the BMP herein described to analyze a signal for similarity with an arbitrary known function, for the purposes of clarity in the present discussion, the input signal 10, is assumed to consist of one or more periodic waveforms that may be continuous or intermittent. The input signal 10 also may include high levels of noise. As will become apparent on reading the present application, the BMP rapidly analyzes the input signal 10 and provides an output signal 22 indicative of the periodic signal frequencies present in the input signal 10.

The input signal 10 may be an unknown signal. As such, the input signal is conditioned for processing. An input signal conditioner 12 (described in detail below) conditions the input signal 10 by limiting the bandwidth of input signal 10, thresholding the input signal 10, to produce a 1-bit binary representation of the signal, and synchronize it with an internal clock oscillator to provide predictable operation of subsequent digital processing circuits. The input signal conditioner 12 outputs a conditioned signal 12S. As can be appreciated, the conditioned signal 12S is devoid of most of the amplitude information associated with the original input signal 10. The conditioned output 12S is conducted via 12A to the Matching Processor 14 (described in detail below). The various connections called out herein, such as 12A, may include any data communication link including serial or parallel buses, cable (coax or ribbon), wireless connections, and the like as are generally known. A clock signal 12C synchronous with valid data states also is generated by Signal Conditioner 12, and conducted to Processor 14 via 12B to coordinate the operation of the digital processing circuits. The present application uses the term "valid", "valid data", or "valid data states" as indicative that an input communication link (such as 12A) has stable data currently present on the communication link.

The Matching Processor 14 determines the degree of matching, or similarity, between the conditioned signal 12S and one or more periodic patterns in the presence of potentially substantial amounts of noise. As can be appreciated, the conditioned signal 12S comprises a bit string of 1s and 0s. The pattern, which also comprises a bit string of 1s and 0s, is sequentially compared to the conditioned signal 12s. Generally, when bits match, the comparison accumulates a match point or count and when they differ, the match points or counts decrease. When the accumulated count exceeds a sufficient number, i.e., the bit strings are sufficiently the same over the comparison, the frequency of the unknown input signal can be said to have a signal consistent with the frequency of the pattern to which it was compared. The periodic patterns can be internally generated or they can be input from external circuitry. The resulting multi-bit output count value signal 12V, from the Matching Processor 14 is conducted to Threshold Detector 16 via 14A. A clock signal synchronous 12m indicating the presence of valid data, i.e., the count value signal 12V, on 14A also is conducted via 14B to Threshold Detector 16. Matching Processor 14 may consist of a single comparison or an array of channels each simultaneously comparing the input signal with different patterns, the patterns may be considered comparison parameters, for the purposes of detecting the presence of multiple simultaneous or intermittent frequencies, and/or phases of frequencies that may be present in the conditioned signal 12S. Array constructions of the Matching Processor 14 are described below.

Whenever Threshold Detector 16 receives a clock signal 12M at clock input 16i, Threshold Detector 16 compares the existing count value signal 12V on data input 14A to a predetermined Signal Detection Threshold Value 17, and, if the signal exceeds the Signal Detection Threshold 17, which is a predefined value, Threshold Detector 16 outputs a detection signal 12T indicative of that condition to the Output Formatter 20 via 16A. The predetermined Signal Detection Threshold Value 17 represents a value at or above which the conditioned signal 12S is considered to match the pattern regardless of the presence of noise. The Signal Detection Threshold 17 is set between a false match (detecting the desired signal when none is present), and not detecting a valid match when it is present but possibly corrupted by noise. The threshold may be fixed and hard wired into the BMP, or it may be an adjustable input to the system to provide application specific flexibility. In implementations where the BMP system contains an array of channels, each examining the conditioned signal 12S for a different match to a different pattern, the thresholds may be fixed and the same for each channel, or they may differ to accommodate such real world effects as non-flat frequency response, and multiple signal interference. The predetermined Signal Detection Threshold Value 17 also may be dynamically updated for each clock cycle from the results of the previous signal analysis.

The Output Formatter 20 receives the detection signal 12T output of the Threshold Detector 16, via 16A, the count value signal 12V, via 16B, and the Threshold Clock 12t, via 16C. Whenever a clock signal 12t is received from 16C, the Output Formatter 20 formats this information to facilitate communication to external systems and devices as may be necessary for the specific user application. In a single channel BMP, this comprises conducting the signals from the Threshold Detector 16 to the Output Signal 22. In cases where an array of BMP's are involved, the number of channels may be substantial, and it may be inconvenient, detrimental to functionality, or impossible due to integrated circuit pin configuration, to conduct all information simultaneously from all channels to the output. In these cases, the Output Formatter 20 functions to select information from the array of Threshold Detectors 16, such as the identification of the channel with the peak accumulated match count, its match value and the match value of adjacent channels, and provide the select processor information as the Output Signal 22. In array constructions using periodic functions, the Output Formatter 20 can implement an interpolation algorithm that provides more resolution than is inherently available from a limited number of channels. A construction of the Output Formatter 20 suitable for use in an array is discussed in FIG. 8.

To simplify this discussion, and to define a construction suitable for linear pipe-lined implementation in single Field Programmable Gate Array (FPGA) or Application Specific Integrated Circuit (ASIC) chip, each functional block in the architecture herein defined generates a clock signal in addition to its process results, indicative of the status of the process results. This data-flow dependent construction facilitates multiple channel implementations because, once new data is clocked into the channels, each channel operates independently of other channels. This minimizes the performance impacts of timing differences related to variable signal path delays due to specific chip place and route implementations. It is noted that conventional registered logic using a common clock signal for synchronization is a subset of the shown data flow dependent construction.

Figure 2:
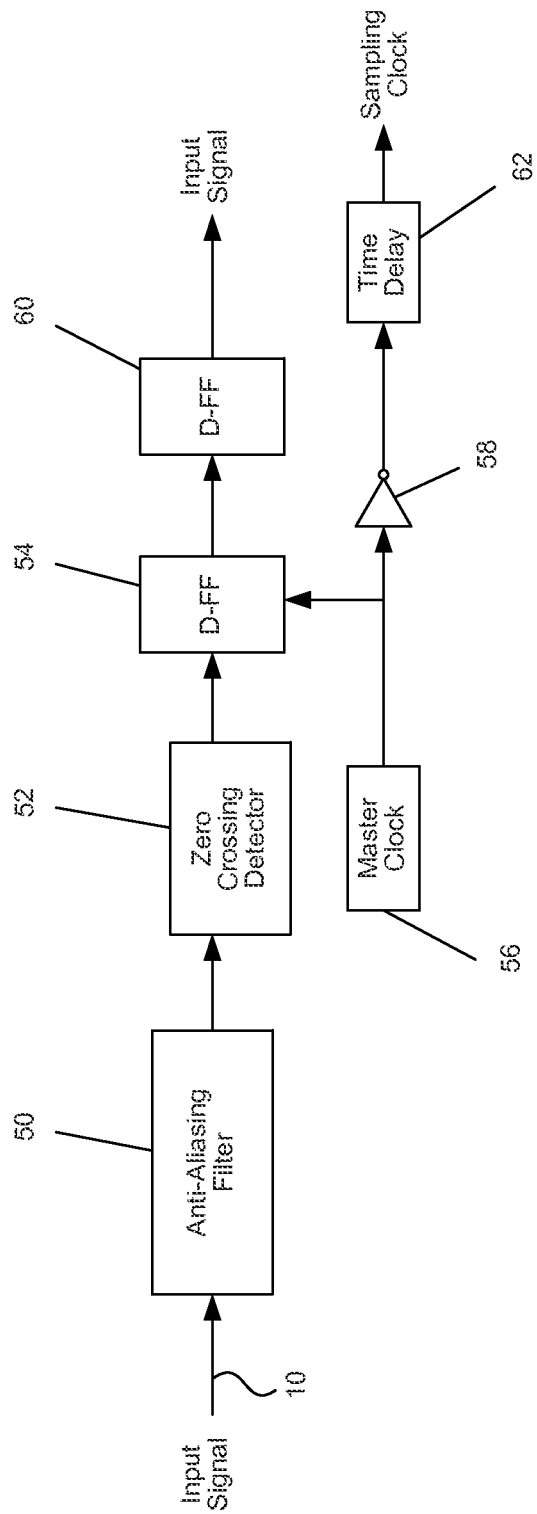
FIG. 2 is a block diagram illustrating an Input Signal Conditioning circuit for the BMP.

FIG. 2 illustrates the details of a construction of the Input Signal Conditioner 12. The input signal 10, in this exemplary embodiment, is an analog signal. The input signal 10, in certain embodiments, may be a digital signal, in which case the zero crossing and anti-alias filters, and possibly the entire Input Signal Conditioner 12 may be optional. The input signal 10 is input to an Anti-Aliasing Filter 50 that limits the bandwidth of input signal 10. For example, the Anti-Aliasing Filter 50 may include a low pass filter to restrict the signal bandwidth to prevent aliasing. For frequency analysis, the cutoff frequency of this filter should be less than half the input sampling rate to satisfy the above mentioned Nyquist criterion. This allows for at least two sampling points per cycle of the highest frequency input. For general patterns and parameters, the filter cut off frequency is not as well defined, but should be set approximately to the inverse of the period of the shortest element defined in the patterns discussed above, and the digitizing period set to less than half of the shortest pattern element. The zero-crossings of the output of the Anti-Aliasing Filter 50 are detected by Zero-Crossing Detector 52, which provides, for example, a True output when the filtered signal is above 0 volts or is transitioning from below to above 0 volts and a False output when the input signal is below 0 volts or transitioning from above to below 0 volts. As one of ordinary skill in the art would recognize on reading the present disclosure, the Zero-Crossing Detector 52 is a special case of a threshold detector where the threshold is set at zero. In certain embodiments, the threshold may be established at other values. This method (signal amplitude zero-crossing) is most advantageous when there is one one signal present in noise or where the one signal of interest substantially dominates all other coherent signals simultaneously present. The output of the Zero-Crossing Detector 52 is conducted to the data input of a Flip-Flop 54 (a D flip-flop or D-FF, for example), where the data input state is latched whenever a clock pulse is received from Master Clock Oscillator 56. The Zero-Crossing Detector 52 thus provides a 1-bit digitized version of the filtered input signal. Improvements in frequency analysis throughput speed over traditional multi-bit FFT approaches are achieved by this 1-bit method in part because the digitizer can be very simple and inexpensive, and required multiplications can be performed by single-bit (Boolean) operations in simple gates. The technology described herein thus enables a new matching at or near the switching speed of the semiconductor material and technology in which the processor is implemented. This approach also facilitates single chip implementation from digitization through processed output. Furthermore, the approach promotes a novel linearized pipe-lined architecture design that can run at high speed, while requiring low operational power. Further, unlike FFT's the relationship between the channels, and the matching patterns of the channels, need not be rigidly defined. In the case of, e.g., frequency detection, this means that different channels can simultaneously operate in independent frequency or phase domains with arbitrary channel spacing, leading to substantial chip complexity reductions and the elimination of additional back end signal processing requirements in some applications.

Employing a standard technique, Flip-Flops 54 and 60 serve to sample and synchronize the input signal 10 with the internal Master Clock 56. This dual flip-flop arrangement also serves to minimize the likelihood of metastable data states, because the input signal is, in general, asynchronous with the Master Clock 56. On the leading edge of each clock pulse, Flip-Flop 54 latches the state of the output signal from the Zero-Crossing Detector 52 and transfers it to its output where it forms the data input to Flip-Flop 60. Flip-Flop 60 latches the output of Flip-Flop 54 on the trailing edge because its clock is derived from the Master Clock 56 through Inverter 58. On latching the input data state, Flip-Flop 60 transfers its input data state to its output, which output forms the conditioned signal 12S from the Input Signal Conditioner 12. The inverted clock signal from Inverter 58 is delayed by Time Delay 62, and subsequently forms a clock signal 12C to a clock input 14*i* on the Matching Processor 14 such that the Matching Processor 14 is alerted to valid data present on communication data link 12A. Time Delay 62 provides a delay equal to the settling time of the Flip-Flop 60, guaranteeing that the clock signal 12C is synchronous with valid states of the conditioned signal 12S output thus providing a "data ready" signal to Matching Processor 14. The availability of a "data ready" signal through the clock pulses, as explained herein, facilitates independent paralleled pipelined processing for each channel in multichannel processors because the processing sequence follows the availability of valid data rather than a direct master clock, which may have uncertain propagation delays when distributed over a large processor chip.

Figure 3:
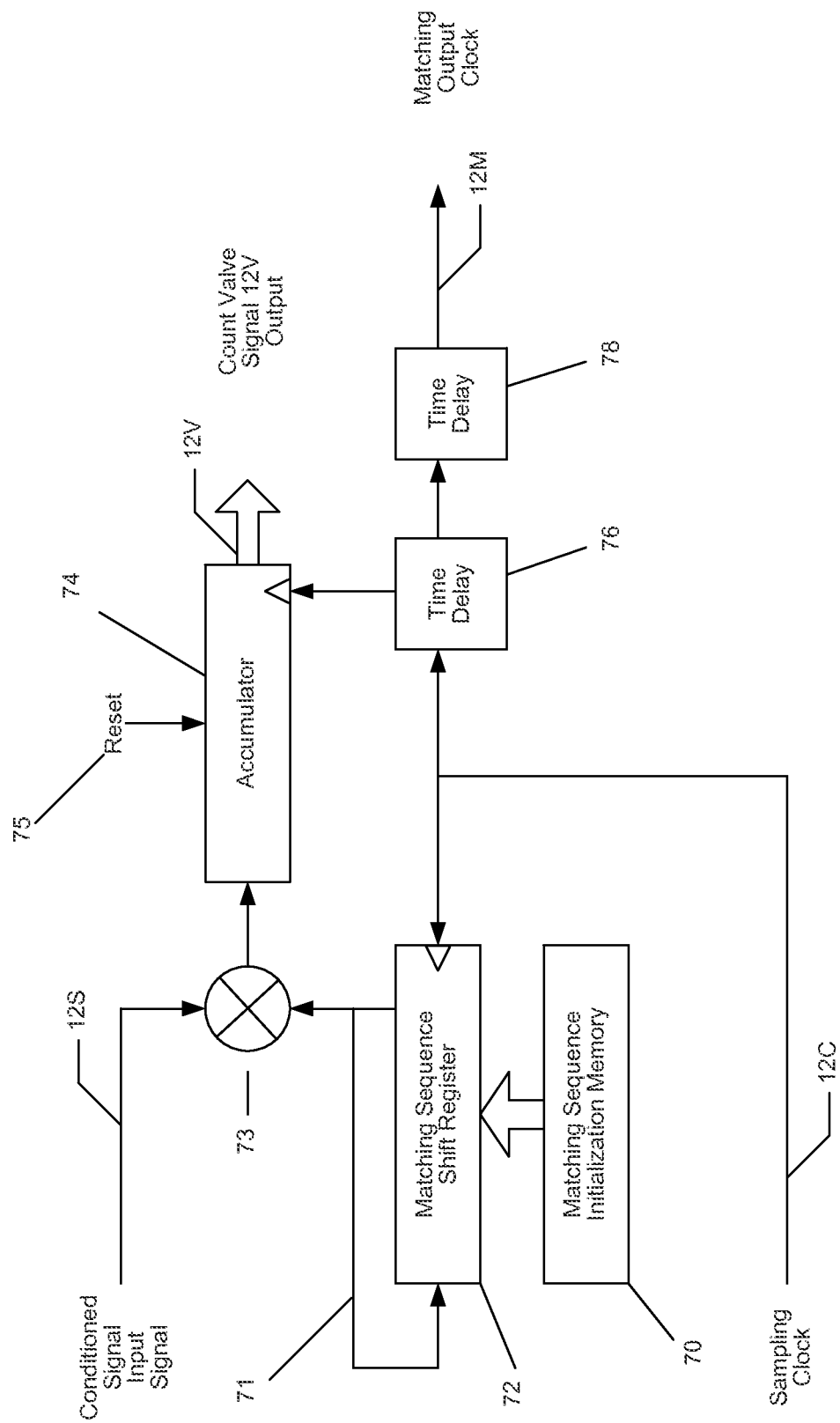
FIG. 3 is a schematic block diagram illustrating a single channel Matching Processor circuit for the BMP.

FIG. 3 depicts a simple Matching Processor 14. Matching Processor 14 is provided in this exemplary embodiment as a single channel employing a single pattern to which the bit string of the conditioned signal 12S is compared. The explanation herein is for ease of reference to the overall system operation, which is substantially the same for multiple channel operations. The pattern of interest is stored in the Matching Sequence Initialization Memory 70. Memory 70 may be as simple as a pre-assigned hard wired code embedded in a processor at the time of manufacture, providing essentially the same functionality for all users, or it may be ROM that is programmed for specific purposes at manufacture, or it may be RAM or EEPROM that may be dynamically addressed and loaded with patterns and parameters while the BMP is operating, providing flexible end user control of the patterns for comparison. On initialization or demand, the sequence stored in Memory 70 is downloaded into the Matching Sequence Shift Register 72.

The Shift Register 72 sequentially presents the bits in the pattern, one at a time, on its output port with each clock pulse received from the clock signal 12C provided from the Input Signal Conditioner 12. The output of Shift Register 72 is recirculated as shown by 71 to its input stage, so that, once loaded, the sequence will endlessly repeat without further access to the Initialization Memory. Be it noted that an equivalent functionality can be achieved in a number of standard ways, for example, by combining the function of the Memory 70 and the Shift Register 72 in a RAM and addressing the RAM locations sequentially using an address counter. Further, be it noted that the matching pattern may be provided by a second live analog or digital signal source, conditioned as previously described for the first signal, said second signal source derived from a different origin, or as a time delayed version of the first signal source. Such an alternative input configuration being useful for inter-signal interferometry (such as used in large array radio telescopy) or for the detection of specific repetitions of specific signal correlation patterns (such as laser target designator signals and coded communications transmission).

The sequentially clocked bit pattern from Shift Register 72 and the bit string of the conditioned signal 12S are multiplied, one bit at a time, by a one-bit multiplier 73. Multiplier 73 can be any conventional multiplier as is generally known in the art, such as, for example, combinations of AND gates, NAND gates, XOR gates, and XNOR gates, which may be arranged to implement substantially similar functionality with slightly different or identical properties. Throughout this discussion, an XNOR gate is described for simplicity. For an XNOR gate, if both the conditioned signal 12S and the current Shift Register 72 output agree, the output of the multiplier is true; if the inputs disagree, the output is false.

A simple counter 74 is used as an Accumulator, that tracks the number of true matches indicated by the multiplier 73 true outputs. In other words, for each true output, the counter 74 increments by 1 value. The output from multiplier 73 accumulates in Accumulator 74. The count contained in the accumulator is incremented each time it receives a clock pulse from the clock signal 12C, suitably delayed by Time Delay 76 to allow for the settling time of the Multiplier 73, while the output of the Multiplier 73 is true. The Accumulator 74 is sized with sufficient capacity to hold expected maximum valid match hits. A reset input 75 to the counter 74 is provided to allow for new analyses to be started, and, the reset signal 75 may be periodically generated to automatically allow updates over specific accumulation periods. The multibit output from the Accumulator comprises the count value signal 12V from the Matching Processor 14. The Matching Processor Output Clock signal 12m indicative of the presence of the count value signal 12V is derived from the clock signal 12C via Time Delay 76 and Time Delay 78, which delay is equal to the propagation delay and settling time of the Accumulator 74. The Accumulator 74 outputs the count value signal 12V as explained above.

Figure 4:
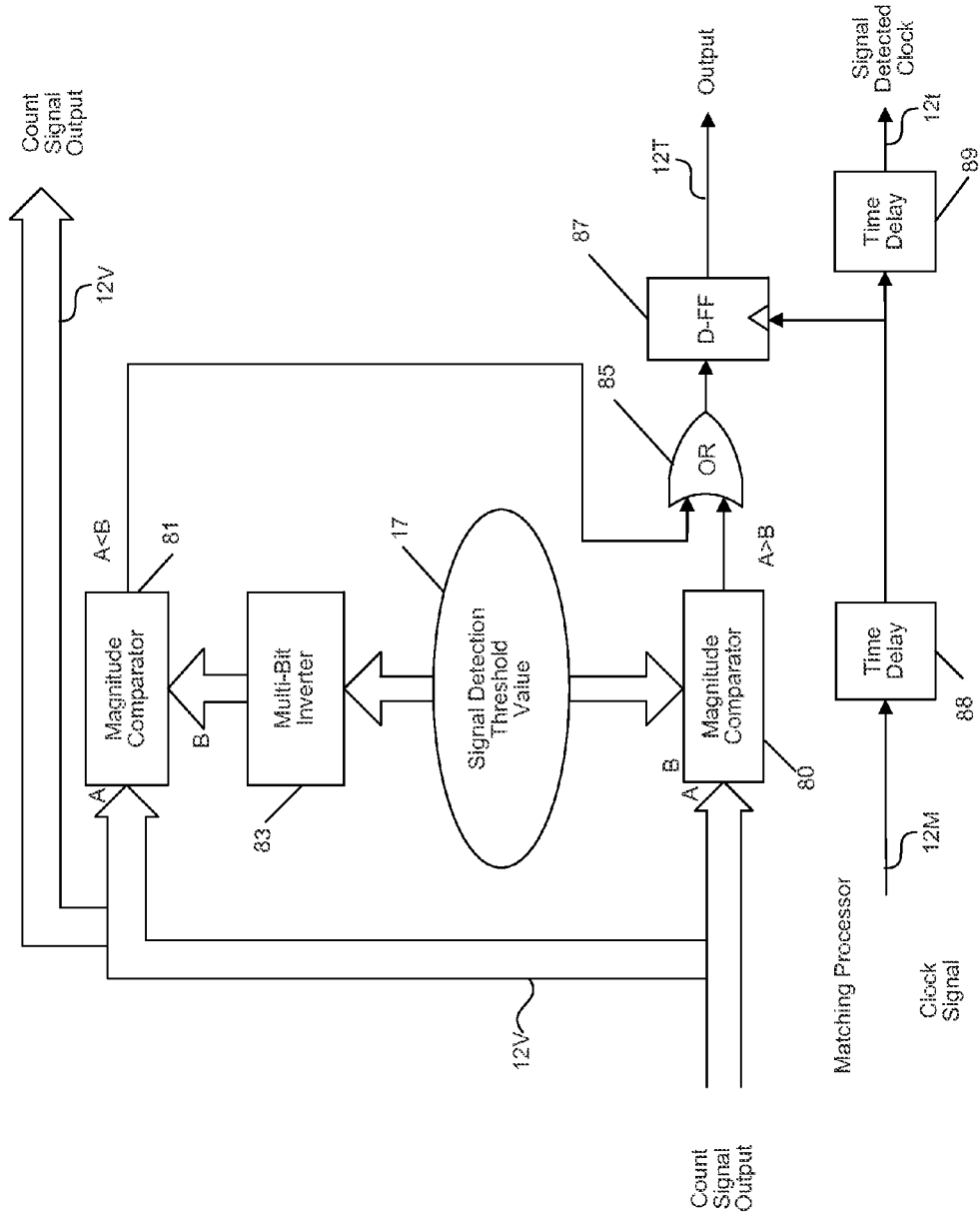
FIG. 4 is a schematic block diagram illustrating a single channel Threshold Detector circuit.

FIG. 4 shows one construction of the Threshold Detector 16. The count value signal 12V from the Matching Processor 14 stage comprises one input to both Magnitude Comparator 80 and Magnitude Comparator 81, labeled the A input. The previously defined Signal Detection Threshold value 17 comprises the B input to the Magnitude Comparator 80 and to Multi-Bit Inverter 83, which establishes a bit complement to the Signal Detection Threshold value 17. The output of Inverter 83 comprises the B input to Magnitude Comparator 81. The count value signal 12V exceeding the Threshold value 17 indicates a sufficient similarity between the input signal 10 and the pattern or parameters associated with the analysis; the Magnitude Comparator 80 provides a true output to one input of OR gate 85. Similarly, if the bit complement of the Threshold value 17 exceeds the count value signal 12V indicating the detection of a substantial negative correlation, the Magnitude Comparator 81 provides a true output to the other input of OR gate 85. In this way, both in-phase and out of phase pattern matches are equally detected as a match. If either input to the OR gate 85 is true, the output of the OR gate 85 is true; if neither is true, the OR gate output is false. The data Flip-Flop 87 latches the output state of the OR gate 85 whenever it receives a matching processor clock signal 12m, which is derived from the clock signal 12C, via a suitable Time Delay 88 to allow for propagation and settling times of the magnitude comparators and OR gate. A threshold detection clock signal 12t is provided from the Threshold Detector 16 to indicate when the detection signal 12T is present. The threshold detection clock signal 12t is derived from the matching processor clock signal 12m via Time Delay 88 and Time Delay 89; Delay 89 being set to allow for the propagation and settling time of the Flip-Flop 87. It should be noted that if no detrimental delays are present in a particular circuit implementation, the Time Delays 88, 89, and similar circuits discussed elsewhere in this description, need not be implemented. Note that in some implementations, it may be advantageous similarly but separately capture and output the in-phase and out-of-phase pattern detection conditions before combination in OR gate 85 in order to preserve and report the phase of the match. In some constructions, it may be advantageous to compare only the positive or only the negative accumulator counts to the threshold. In such cases, or gate 85 and the unused magnitude comparator can be deleted and the appropriate magnitude comparator A>B output conducted directly to the FF 87 data input.

Figure 5:
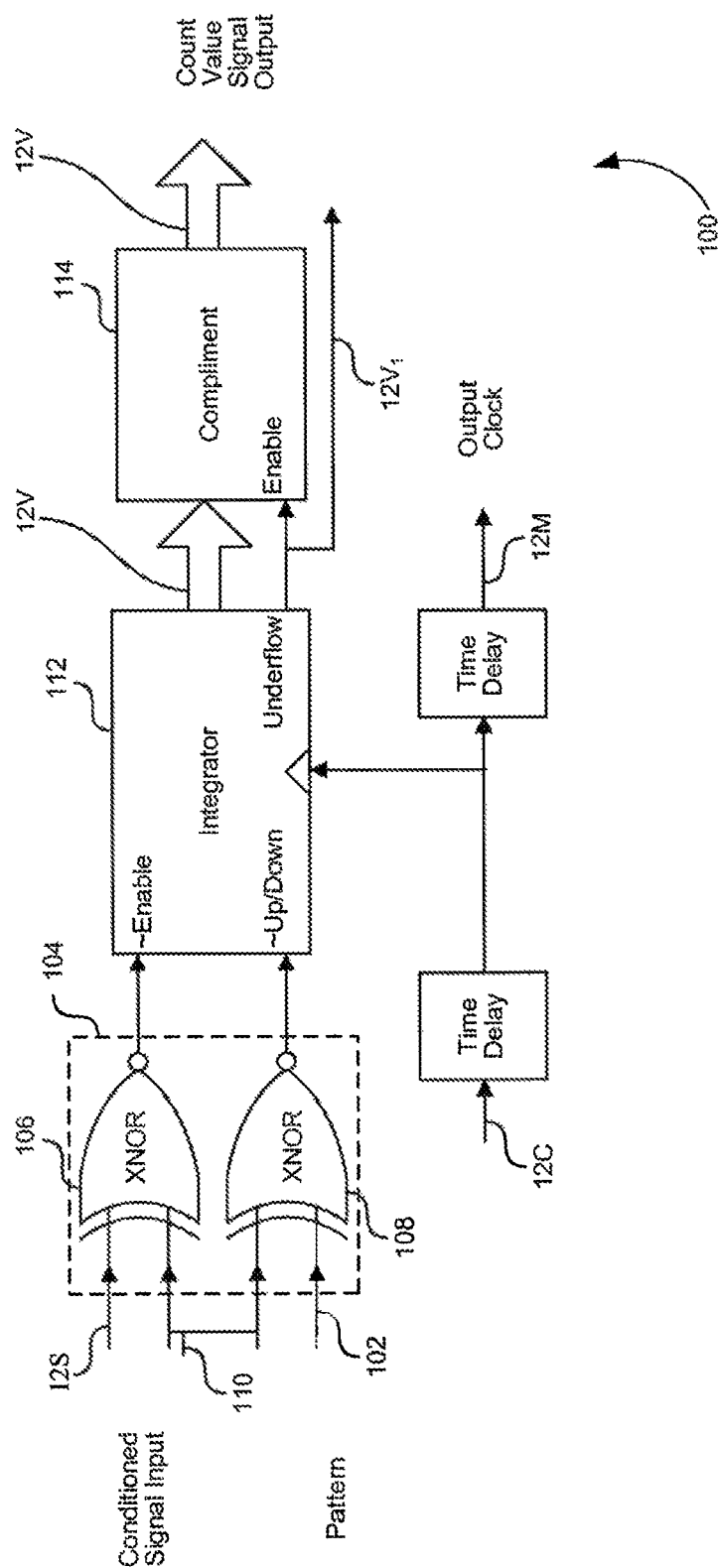
FIG. 5 is a schematic block diagram illustrating a continuously updating matching processor.

FIG. 5 provides a specific exemplary implementation of a Matching Processor 100. Matching Processor 100 receives the conditioned signal 12S as input as well as the pattern 102 to which the conditioned signal 12S is to be compared. The inputs 12S and 102 are provided as bit strings to a multiplication circuit 104, which in this exemplary embodiment, comprises a pair of XNOR gates 106, 108. The multiplication circuit 104 also receives an input 110 that is a qualifier input. The input 110 may be a shifted or delayed version of the conditioned signal 12S or the pattern 102, for example. Shifting or delaying the input 110 provides, in one aspect, a check regarding whether any particular zero-crossing was the result of noise, or the result of the signal absent noise, crossing zero. In this configuration, through feedback of a delayed pattern or input signal to the input 110, the Matching Processor 100 also enables critical negative feedback that prevents overflowing or underflowing the accumulator, and imposes a finite accumulation time (similar to a rolling or incrementing boxcar average), eliminating the need for integral resets. Accordingly, the delay time of the delayed pattern can be chosen to equal the transform length for e.g. FFT-equivalent spectral analysis, or shorter to provide more rapid sub-pattern matching, or longer (usually an integer multiple) to provide integrated averaging of multiple sequential complete transforms as is useful for additional detection noise reduction. It is advantageous in all cases to size the accumulator according to the maximum number of clock cycles in the delay period to prevent overflow or underflow conditions.

When the bit string of the conditioned signal 12S and the input 110 differ, a counter 112, which may be, for example, a synchronous or asynchronous up/down counter as is generally known in the art, receives a "false" or 0 output from the XNOR gate 106 at the enable input, enabling signed 1-bit summation (increment or decrement) with the currently stored count on the next clock cycle. To determine the sign of the summation, the bit string of the input 110 and the pattern 12 are compared in XNOR gate 108. If the said bits differ, a "false" or 0 output from XNOR gate 108 is received at the ~up/down input to counter 112, a false or 0 output from XNOR gate 108 provides a 1-bit addition indication such that the counter 112 increments in this particular example on a "false" or 0 output from XNOR gate 108 on the next clock cycle providing the enable signal from gate 106 is also coincidentally false at that time. Conversely, a true or 1 output from XNOR gate 108 provides a subtraction indication such that the counter 112 decrements in this particular example on a "true" or 1 output from XNOR gate 108. The counter 112 should have sufficient size to count to the maximum increment or decrement value desired as discussed previously. Table 1 provides a sample logic diagram for the various sequences. The actual inputs would be dependent on the actual signals.

TABLE 1

| conditioned signal 12S | input 110 | pattern 12 | Integrator Enable In | Integrator Up/Down In | counter 112 action |
|---|---|---|---|---|---|
| 0 | 0 | 0 | 1 | 1 | NC |
| 0 | 0 | 1 | 1 | 0 | NC |
| 0 | 1 | 0 | 0 | 0 | +1 |
| 0 | 1 | 1 | 0 | 1 | −1 |
| 1 | 0 | 0 | 0 | 1 | −1 |
| 1 | 0 | 1 | 0 | 0 | +1 |
| 1 | 1 | 0 | 1 | 0 | NC |
| 1 | 1 | 1 | 1 | 1 | NC |

As shown in Table 1, when conditioned signal 12S, input 110, and pattern 102 are the same, (i.e., all 1 or all 0), the counter 112 is inhibited from counting in this example. When conditioned signal 12S and the pattern 12 agree (both 1 or both 0), but input 110 differs (not 1 or not 0, respectively) the counter 112 increments. When conditioned signal 12S and the pattern 12 disagree (either 0 and 1, or 1 and 0, respectively), and input 110 matches the pattern 12 (either both 1 or both 0), the counter 112 decrements. In this way, the desired negative feedback is achieved for the purpose of this example as these states allow properly signed addition by the counter only when the oldest (input 110) and newest (input 12S) bits disagree, implementing effective a cancellation of the oldest with the newest input multiplication results, maintaining the pipelined gate operations while eliminating the need to activate the count circuit, or otherwise consume the energy or time to calculate and propagate a new result to the output. This mathematical process is useful, for instance, to rapidly and efficiently calculate the continuously updated correlation between conditioned signal 12S and pattern 102 over a fixed interval by simply delaying by the desired number of clock cycles the conditioned signal 12S and applying it to the input 110. In this case, the accumulator count is also maintained within finite limits. Alternatively, the pattern 102 may be delayed by the desired number of clock cycles and applied to the input 110. Depending on the initialization state of counter 112 (e.g., either 0 or one-half the maximum count), signed or unsigned integer representations of the total count may be implemented, respectively. In the signed case (counter 112 initialized to 0), as the counter 112 counts down, it may be necessary to provide a compliment 114 that inverts the count signal value 12V and provides a negative signal indication $12V_1$.

Figure 6:
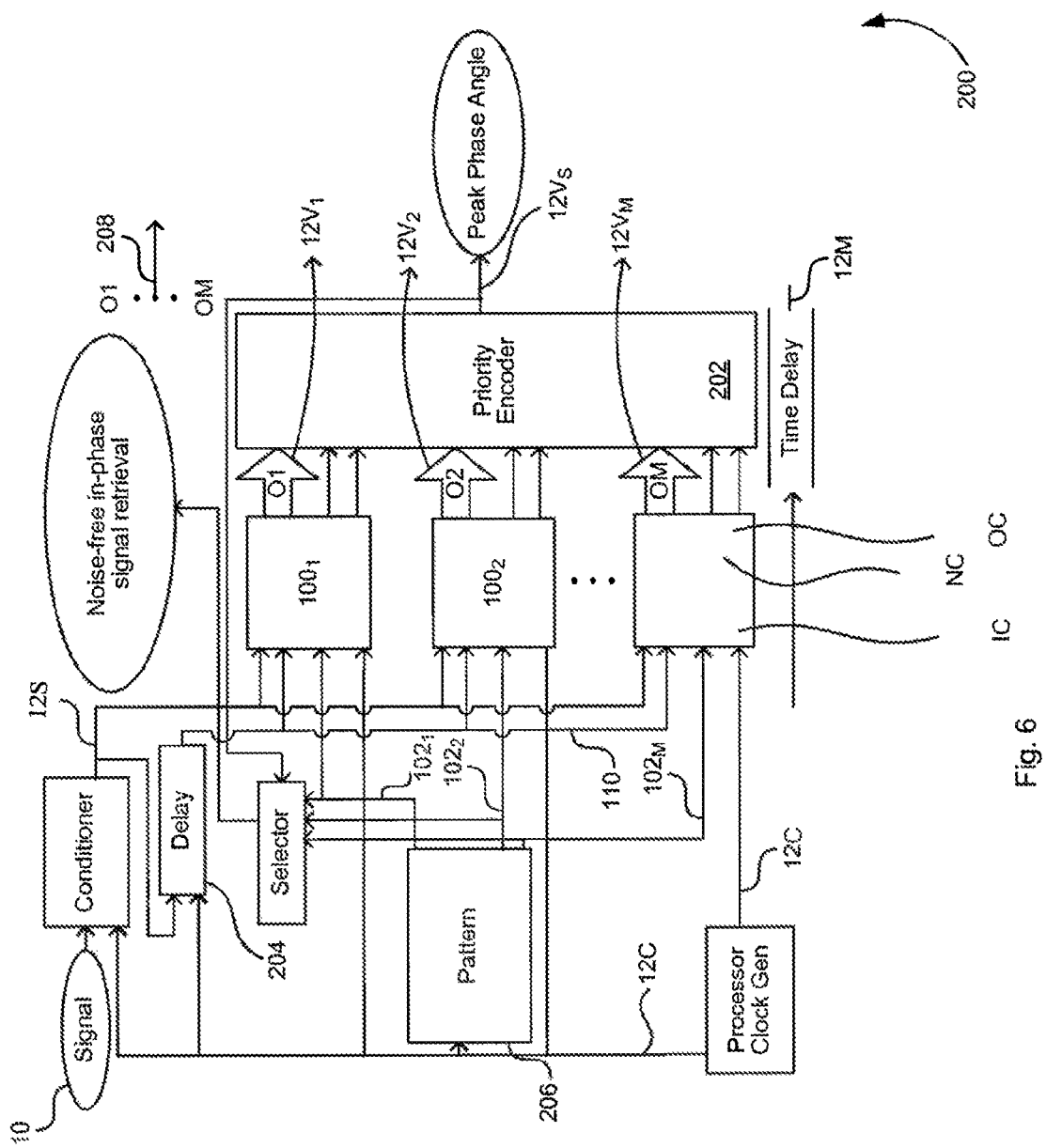
FIG. 6 is a schematic block diagram illustrating a matching processor useful for pattern identification and phase detection.

The Matching Processor 100 described above may be useful in specific applications. With reference now to FIG. 6, a basic phase detection and analysis system combining an array 200 of BMPs $100_{1-m}$, are provided. In this case, M determines the basic phase resolution of the system relative to the phase of the pattern 102 to which the conditioned signal 12S is compared where pattern 102 has a bit length of at least N (N=length of the sequence for which detection and phase relationship is sought), a conditioner 12 conditions the input signal 10 to obtain a conditioned signal 12S, which, as explained above, may be a 0-crossing detector to eliminate amplitude variations from an analog or digital input signal, a delay means 204, such as a shift register or the like, for the input signal that has a length equal to the desired integration period determined by a number of clock cycles (typically an integer multiple of N), and a priority encoder 202 to identify the peak phase detection among the BMPs $100_{1-m}$. The peak phase detection may be, for example, the highest of the count value signals $12V_{1-m}$, or the highest sum of adjacent count values where the signal phase may take intermediate values between channels.

In operation, the conditioned signal 12S, which may be 0-crossings determination of the input signal 10, at each clock cycle are represented by a series of 1's and 0's depending on whether the input signal is above or below 0 volts (or a digital stream that is already in that condition), are presented to a delay means 204 (such as a shift register or sequentially addressed RAM locations). The conditioned signal 12S is an input to each of the BMP 100s. The delayed or shifted conditioned signal 12S, in this example, becomes the input 110. The input 110 may represent the oldest data to be subtracted from the product integral. Simultaneously, a sequential bit is selected from each of the phase-delayed versions of the bit pattern 102 stored in the memory 206, and conducted to the input of each of the BMP 100s. In an exemplary embodiment, only one pattern 102 is provided. The pattern 102 represents the bit pattern of length N to be recognized in the conditioned signal 12S, and each of the patterns $102_{1-m}$ represent a unique phase delayed version of the pattern where the phase-delayed versions may be derived from sequential taps into a single pattern. The count value signal $12V_{1-m}$ is conducted to a priority encoder 202 and also may be made available as an output representing the complete bit sequence 208 function over the integration time that is updated on every clock pulse. The priority encoder provides an identification of the BMP cell that is outputting the best integrated phase match on each clock pulse representing the peak phase angle in the phase function for the bit sequence compared to the input data stream and outputs that count value as the selected count value signal $12V_s$. In addition, the peak phase matched channel output from the priority encoder can be used to select and output the actual peak phase pattern to provide a noise-free output phase locked to the noisy input signal.

The identification of the peak BMP $100_{1-m}$ at any moment, as detected by the priority encoder 202, is an indication of the best estimate of the instantaneous signal phase angle, as would be useful for demodulation of QPSK, 8PSK or 16PSK, or similar high density high speed communications techniques in this exemplary embodiment. In target identification applications, the peak phase of the target sequence also indicates the position in the image, or the centroid of a symmetric pattern in the image field. The peak channel's bit sequence input may be automatically selected for output to provide a noise free version of the best signal to phase match, as would be beneficial for, e.g., clock recovery or demodulation of spread spectrum communications. Alternatively, the count value signal $12_{1-m}$ for each $BMP_{1-m}$ may be output directly to indicate the full phase function, as would be useful in a lidar system where the pattern 102 is a PRN code sequence that is orthogonal for each phase delay, and each phase delay channel represents a different range gate.

For best pattern recognition it is advantageous if the noise-free patterns each accumulate a net zero sum when compared to all other patterns and pattern phases in the pattern buffer over the anticipated accumulation time (AKA the orthogonality property).

The pattern 102, however, can be any suitable pattern of 1's and 0's that is unique. Also note that the memory 206 may provide a plurality of patterns 102 that could differ from one another in the memory associated with each $BMP_{1-m}$, and may each be of different lengths (in which case a normalization factor can be added to shorter correlation length channels). An alternative embodiment in this case would include a different length delay of the input signal going to each cell or group of cells, as appropriate for its respective correlation sequence.

Figure 7:
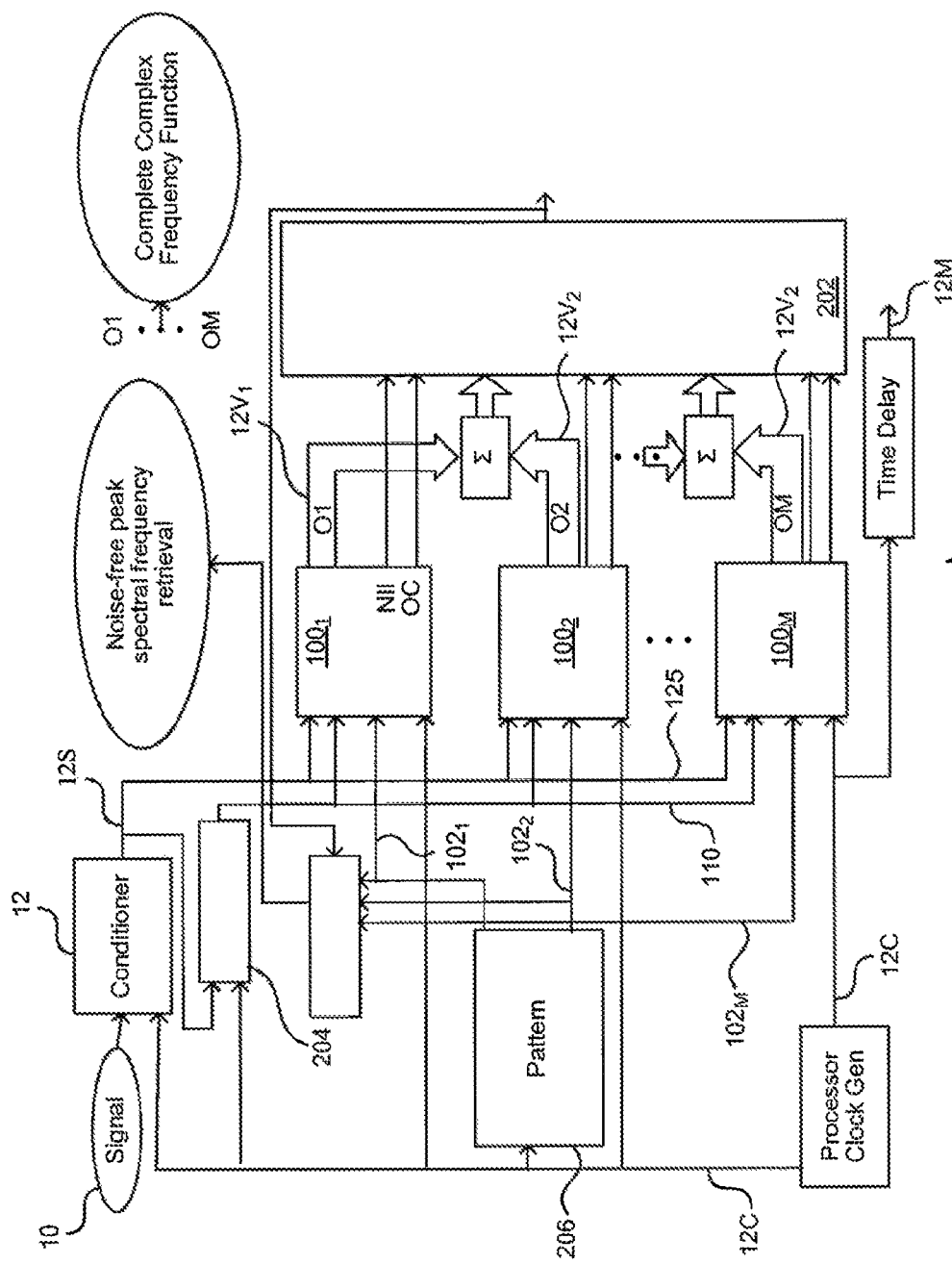
FIG. 7 is a schematic block diagram illustrating a matching processor useful for spectral processing.

FIG. 7 provides another application of the matching processor 100 in an array 300 of matching processors $100_{1-m}$. The array 300 is provided specifically for spectral processing. The pattern 102 useful for spectral processing typically comprises periodic functions that differ in period from one another by 1/(spectral resolution) desired and the correlated energy in channels with quadrature phase relationships for each frequency channel is combined before selecting the peak spectral channel. In one exemplary embodiment, the pattern $102_1$ would be identical to pattern $102_2$ but offset by 90 degrees. To mimic the output of a conventional FFT, the pattern 102 may contain a binary spectral transformation defined, for example, as a periodic function that is periodic on M, where M is the minimum sequence length needed to achieve the channel center frequency for a given digitizer clock frequency. Note that the clock frequency should be at least twice the signal frequency to satisfy the Nyquist sampling requirements unless aliasing is desired for the particular application. The following two relationships hold for such bit sequences:

$M$=Digitizer Rate/Bandwidth(round to nearest integer)

Maximum Channel Frequency=Digitizer Rate/2

Because digital signal processing uses quantized temporal states, the bit patterns required to represent specific ratios of the digitizer rate to the channel center frequency are not intuitive. However, the appropriate bit patterns can be derived given the digitizer rate, and the center frequency and bandwidth of the channel (in the same units as the digitizer rate). An algorithm for the determination of appropriate frequency analysis bit sequences of M length is delineated below. Essentially, the algorithm distributes symmetrically and uniformly over M positions the error caused by digitizing the sometimes non-integer ratio between the channel frequency and the digitizer rate. The following steps are carried out in the algorithm.

A. Calculate M and create an array of M length;
B. Initialize the Array to all 1's;
C. Calculate and Mark the locations of bit transitions with 0's as follows:
  (Calculation of marker index assumes array indexing starting with 0)
  Calculate F=Digitizer Rate/(2*Channel Frequency)
  1. Round F to the nearest integer;
  2. Calculate the set, [X]=I*F, where I is all Integers: 1 . . . I*F<M;
  3. Round off each member of the [X] to the nearest integer; and
  4. Use each value in the set [X] to indicate the index of the location in the array at which to place a marker (0 value), and place the markers.
D. Sequentially scan the entire Array and replace each element in the Array with either: the same value as the previous element if the current element is not a marker or the complement of the previous element, if the current element is a marker.

FIG. 8 provides Table 2 that shows a set of bit patterns calculated from this algorithm for 16 separate channels with uniformly spaced center frequencies between 1/16 of the maximum frequency and the maximum frequency, each with an approximate bandwidth 1/16 of the maximum frequency channel (set to the digitizer rate/2). In the illustration of FIG. 12, sequences (columns) for 16 frequency channels (rows) are uniformly spaced between the highest frequency (set at half the digitizer rate) channel 16 and lowest frequency 1 (1/16 of the highest frequency). Uniformly spacing the center frequencies of the channels, and making the digitizer rate twice the highest frequency channel frequency creates effectively a uniform spectral coverage transform with similar properties to the well-known DFT, and its common multi-bit math implementation in the FFT.

On examining the patterns in FIG. 8 it is also clear that symmetric periodic functions generated in this way can be easily replicated using only the left (for example) quarter of the table according to the following algorithm:

Replicate the right half (columns 17-32 in FIG. 8) of the table from the left half (columns 1-16 in FIG. 8) by inverting the left half and mirroring about the center From the left most quarter of the columns (1-8 in FIG. 8), create the second quarter of the columns (9-16 in FIG. 8) by mirroring the odd numbered rows, and inverting and mirroring the even numbered rows.

Recognition of the symmetry in these patterns and storing only the unique information in each can lead to substantial savings in memory for implementations of large arrays of Matching Processors.

In any event, for the spectral frequency processor outlined in FIG. 7, the conditioned signal 12S and a shifted version of the conditioned signal, which is input 110, along with the bit sequences of pattern $102_{1-m}$ are provided to the matching processor arrays $100_{1-m}$, wherein the patterns are offset by 90 degrees. The matching processors $100_{1-m}$ output respective count value signals $12V_{1-m}$. For spectral power analysis in this example, the absolute values of the sequential pairs of count value signals $12V_{1-m}$ are summed, taking proper regard for the signed or unsigned integer representations in any particular implementation. This sum closely represents the magnitude of the signal in any particular frequency channel. For example, in this exemplary embodiment, absolute count value signals $12V_1$ and $12V_2$ are summed, absolute count value signals $12V_3$ and $12V_4$ are summed, . . . , and absolute count value signals $12V_{m-1}$ and $12V_m$ are summed. The priority encoder 202 selects the summed absolute count value signal that identifies the peak frequency component from all pairs of channel outputs that share the same periodic pattern 102 as indicated. Note that in cases where the frequency of the signal may take intermediate values between the discrete pattern frequencies, it may be advantageous to compare the sums of adjacent channel absolute sums before selecting the peak match in the priority encoder. A dynamic tracking threshold (not shown) can be derived from the intensity value of the peak that is used to indicate a valid detection, and dynamically latch the last peak value to prevent momentary dropouts due to speckle noise for instance, or to prevent output hopping when there is more than one strong signal in the spectral width. The lower and upper 180 degree phase space for full quadrant detection is already accommodated in this example because the outlined structure includes compliment rectification of the out of phase spectral match peaks. Carrying out the Negative Integration Indicator (NII) from each cell allows recognition of which set of quadrants the solution is in to enable applications that require this information.

Be it noted that one advantage of the BMP over a DFT or an FFT is that it may be customized in the relationship between the frequency, phase, and pattern of each matching sequence of each channel independently. This allows for, e.g., non-uniform and widely dispersed, or sparse (narrow bandwidth but distantly separated. Not overlapping as with FFT), frequency channels, or channels with differing bandwidths or intermittent patterns. Such functionality may be useful in applications such as, for example, direct detection correlation radio, that makes possible the elimination of most software or hardware blocks in current technology software radio, and may greatly simplify or eliminate all the backend post processing currently required to detect the signals, to name but one useful application among many. In e.g. software radio applications, to optimize performance in the presence of large potential signal dynamic range and many simultaneous signals of varying strengths, it may be advantageous to precede the zero-crossing detection in each cell with an integration of the differential between sequential samples of the input signal. The integration gates of the at least two sample and holds is most advantageously controlled by the pattern state (i.e. 1 or 0 synchronously with the pattern state delivered to aforementioned input 102 in FIG. 5 with a suitable advance in timing to accommodate circuit delays. In this way, the background signals unrelated to the present cell pattern are substantially removed before zero-crossing detection.

Figure 9:
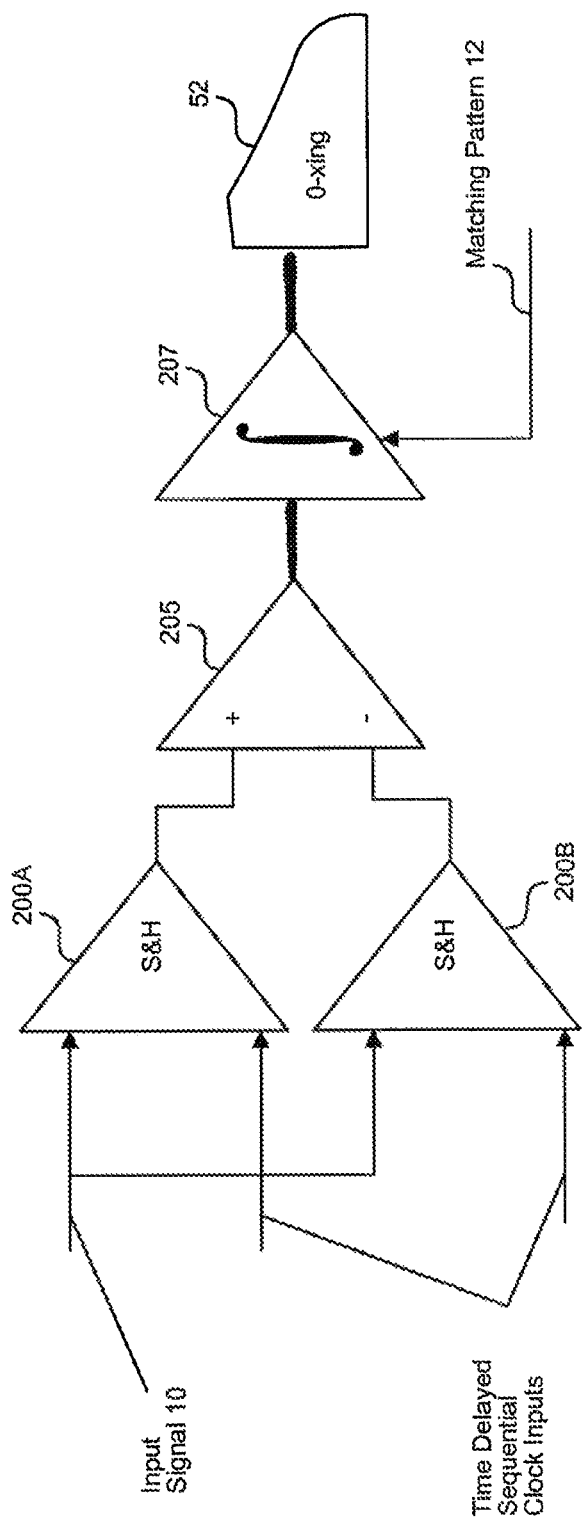
FIG. 9 is a schematic block diagram illustrating an alternative Input Signal Conditioning circuit that has utility for applications where there may be a multiplicity of simultaneous input signals in addition to noise.

FIG. 9 shows one construction of the frequency selective integration of a differential input conditioner that extends the performance envelope of the BMP into symmetric pattern matching applications where a multiplicity of signals of varying strengths may be simultaneously present, and where independent detection of each may also be important. The raw signals 10, which may be subjected to prior bandlimit or anti-aliasing filtering as previously described, are conducted to Sample and Hold circuits 200 A and 200B, the outputs of which are conducted to the non-inverting and inverting inputs of a differential amplifier circuit 205. The enable inputs of S&H 200A and B are driven in sequential fashion by the system clock so as to always hold sequential values of the input signal 10, thus the output of amplifier 205 is always proportional to the first derivative of the input signal. Note that in multiple-cell processor configurations, there may be a single set of Sample&Hold and Differential Amplifier circuits common to all cells or channels. The output of differential amplifier 205 is conducted to a cell-specific integrator 207 that integrates the output of the input differential sample and hold signal. The aforementioned zeo-crossing detector 52 monitors the output of the integrator 207 reporting the sign of the integrator output as a 1 or a 0, with subsequent operation of the BMP processor as previously defined. The reset inputs of S&H 200A and B are driven by the state of the matching sequence 71 for the particular cell, so that the integration period of 207 corresponds to the period of the corresponding matching sequence 71 during which the state is static. Thus, the output of 207 represents the integrals of the signal derivatives over the 1 and 0 segments of the corresponding matching sequence, and the zero-crossing detector indicates whether the integral was negative or positive. This integral will tend to zero for signal patterns not matching the sequence 71, but either tend above 0 for in-phase matching sequences or tend below 0 for out-of-phase matching sequences. For frequencies higher than the matching sequence, first order cancellation takes place during the integration phase due to the cancellation of most negative and positive cycle contributions during the integration period. For frequencies lower than the matching sequence, cancellation takes place during the differencing in 205 (since the lower frequency signal has substantially the same amplitude during each 200A and B integration cycle). Residual higher and lower frequency contamination is removed by the normal pattern matching action of the BMP. As may be appreciated by one skilled in the art, in a similar fashion, the input signal conditioning and pattern matching functions of the present invention may be alternatively configured to use integrals or higher order derivitives of the signal to accomplish pattern matching detection or identification of other signal attributes containing signal intelligence. Additionally, it may be recognized that such pattern recognitions can also be used in a negative sense to detect pattern defects or disruptions in a signal, and subsequently used to detect or to correct errors in a signal stream.

Peak frequency is important in, e.g., Doppler lidar processing, where the peak frequency indicates velocity, and in vibration analysis, where the peak indicates fundamental mode to name but two examples. The complete quadrature spectrum output is useful for general power spectrum and phase analysis. A select group of channel outputs may be useful for a variety of applications including, e.g., deriving super-channel-resolution peak frequency position by fitting a smooth function to the peak and adjacent channels to name one example. The noise-free peak frequency output also may be useful, e.g. for tracking LO's in satellite signal receivers and deriving carriers in suppressed carrier signal reception.

Those skilled in the art would appreciate that there are a great variety of alternative ways to combine the outputs of accumulators to define, for example, signal phase from ratios of the in-phase and quadrature sums for each of the frequency pattern matches, or true spectral signal power from the sum of the squares of the accumulator powers, simply by outputting all accumulator values to allow any desired combinatorial or higher level math or selection process in post processing by an external computer as dictated by the requirements of the particular application. Likewise, it is clear that any such higher level math processing on any particular channel or combination of channels could be implemented on a single chip without violating the fundamental tenants of the instant invention.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A system for determining a match between an unknown signal and a known signal, the system comprising:
   an input signal conditioner, the input signal conditioner comprising a receiver to receive an unknown signal, a detector to detect whether the unknown signal exceeds a threshold and to detect a sign of an integral of a derivative of the input signal, and a transmitter to output a conditioned signal, wherein the conditioned signal comprises a bit string;
   a memory to store at least one pattern to which the conditioned signal is to be compared to determine whether a match exists between the at least one pattern and the unknown signal, the at least one pattern comprises a bit string;
   a comparator, the comparator operatively coupled to the input signal conditioner and the memory, the comparator to receive the conditioned signal and the at least one pattern to compare on a bit by bit basis, the comparator outputting a count signal when the bit of the conditioned signal and the bit of the at least one pattern match; and
   an accumulator to increment on each count signal output from the comparator.

2. The system of claim 1 wherein the detector is a threshold-crossing detector.

3. The system of claim 2 wherein the threshold is 0.

4. The system of claim 2 wherein the bit string comprises bits selected from the group of bits consisting of: "1" or "0".

5. The system of claim 1 wherein the comparator comprises at least one logic gate.

6. The system of claim 5 wherein the comparator further comprises at least two logic gates wherein a first logic gate receives as input the conditioned signal and a shifted conditioned signal and wherein the second logic gate receives as input the shifted conditioned signal and the at least one pattern.

7. The system of claim 6 wherein the first logic gate and the second logic gate are XNOR logic gates.

8. The system of claim 6 wherein at least one output of the at least two logic gates is used to control the accumulator by enabling accumulations and determining the sign of each accumulation according to the gate input conditions.

9. The system of claim 1 wherein the at least one pattern comprises at least one of a pair of patterns, wherein each pair of patterns comprises a first signal pattern and a second signal pattern.

10. The system of claim 9 wherein the second signal comprises the first signal phase shifted.

11. The system of claim 10 wherein the second signal is shifted 90 degrees from the first signal.

12. The system of claim 9 wherein the conditioned signal is phase shifted prior to the comparator receiving the conditioned signal.

13. The system of claim 12 wherein the conditioned signal is phase shifted 90 degrees.

14. The system of claim 1 further comprising a plurality of comparators wherein each of the plurality of comparators compares the conditioned signal with a different at least one pattern, and wherein each of the plurality of comparators outputs a count signal indicating the accumulated correspondence between the input signal and the at least one pattern.

15. The system of claim 14 further comprising a priority encoder to select the highest count signal as a best match.

16. The system of claim 14 further comprising a priority encoder wherein the highest count is determined as a sum of absolute values of a correspondence between the conditioned signal and the at least one pattern and the conditioned signal and the at least one other pattern.

17. The system of claim 1 wherein the at least one pattern is determined by a second input signal sequence selected from the group of input sequences consisting of: a delay of the input signal or an external signal.

18. The system of claim 17 wherein the comparator further comprises at least two logic gates wherein a first logic gate receives as input the conditioned signal and a shifted conditioned signal and wherein the second logic gate receives as input the shifted conditioned signal and the at least one pattern and wherein at least one output of the at least two logic gates is used to control the accumulator by enabling accumulations and determining the sign of each accumulation according to the gate input conditions.

19. A method for determining a match between an unknown signal and a known signal, the method comprising:
   conditioning a received, unknown signal by limiting a bandwidth of the received, unknown signal and digitizing the received, unknown signal to output a conditioned signal;
   comparing the conditioned signal on a bit by bit basis to at least one known pattern;
   on a bit by bit basis determining whether the conditioned signal and the at least one known pattern match based on the comparison;
   incrementing a counter when it is determined on a bit by bit basis that the conditioned signal matches the at least one known pattern;

comparing the counter to a predetermined threshold; and
outputting a signal indicating the received, unknown signal matches the at least one known pattern when the counter equals or exceeds the predetermined threshold.

* * * * *